No. 774,714. Patented November 8, 1904.

UNITED STATES PATENT OFFICE.

WILLIAM H. WALKER, OF NEWTON, MASSACHUSETTS.

CELLULOSE ACETATE.

SPECIFICATION forming part of Letters Patent No. 774,714, dated November 8, 1904.

Application filed November 18, 1902. Renewed August 6, 1904. Serial No. 219,781. (No specimens.)

*To all whom it may concern:*

Be it known that I, WILLIAM H. WALKER, of Newton, county of Middlesex, State of Massachusetts, have invented an Improvement in Cellulose Acetate, of which the following description is a specification.

This invention relates to improvements in cellulose acetate and other stable derivatives of cellulose, whereby the advantages gained by the addition of a solvent of low volatility to the cellulose derivative, as described by my application Serial No. 131,244, are greatly enhanced and the solvent thus employed rendered permanent or fixed.

When a stable cellulose derivative—for example, cellulose acetate—is modified by the addition of a solvent of low volatility—for example, phenol or cresol—and subjected to a moderate degree of heat, the solvent is in time volatilized and the cellulose derivative reverts to its original condition. This is true also of the cellulose derivative modified by the presence of thymol, although to a much less degree. A stable cellulose derivative may also be modified by the addition or presence of a solvent in which the tendency to volatilize is so small as to be negligible, and yet such solvent may be of no practical value on account of its great tendency to crystallize, and thus separate from the other components of the material.

I have discovered that if to cellulose acetate or other fatty acid ester of cellulose modified, as above described, be added a suitable quantity of certain non-volatile substances, which in themselves are not solvents, as castor-oil, the solvent of low volatility becomes substantially fixed and is not driven off even after prolonged heating, while a solvent which in itself is not volatile, but which is not practicable on account of undue tendency to crystallize—as, for example, acetanilide—is evenly retained in its amorphous condition in the resultant material. I have also discovered that when thymol or other substance having similar effect is combined with a cellulose derivative a much larger amount of a non-solvent material, such as castor-oil, may be introduced without subsequent segregation or precipitation. Such a compound, for example, may be produced as follows: Ten parts of cellulose acetate are added to eighty parts of chloroform and five parts of thymol. When solution is complete, to this is added three parts of castor-oil dissolved in twenty parts of chloroform, or the castor-oil may be combined with thymol by means of heat added to the cellulose acetate and the resultant plastic mass further manipulated as for the production of films, sheets, or solids, and dyes, pigments, and inert materials may be incorporated with the plastic material, which by itself or with these (or other) additions may be spread or otherwise disposed on cloth, metal, or other backing or support. When the chloroform in the first instance is completely driven off, the castor-oil, which without the thymol would precipitate out or segregate into spots, is held in complete solution in the resultant article, while the presence of the castor-oil fixes and renders permanent the thymol employed. This combination of a solvent of low volatility and a non-volatile non-solvent which renders the former substantially permanent I designate as a "fixed solvent."

Having thus described my invention, what I claim as new, and desire to secure by Letters Patent, is—

1. A stable derivative of cellulose, as cellulose acetate, together with a solvent of the same fixed by the addition of a non-solvent.

2. A cellulose ester of a fatty acid modified by the addition or presence of a "fixed solvent," as herein described.

3. A new composition of matter containing a stable derivative of cellulose modified by the addition of thymol and castor-oil.

4. A new composition of matter consisting essentially of cellulose acetate modified by the addition or presence of a "fixed solvent."

5. A new composition of matter consisting essentially of a stable derivative of cellulose, as cellulose acetate, modified by the addition or presence of a highly-crystallizable solvent held in the amorphous condition by a non-solvent.

6. A new article of manufacture consisting essentially of a stable derivative of cellulose, as cellulose acetate modified by the addition or presence of a fixed solvent and attached to a support.

In testimony whereof I have signed my name to this specification in the presence of two subscribing witnesses.

WILLIAM H. WALKER.

Witnesses:
B. J. NOYES,
H. B. DAVIS.